United States Patent Office 3,237,384
Patented Mar. 1, 1966

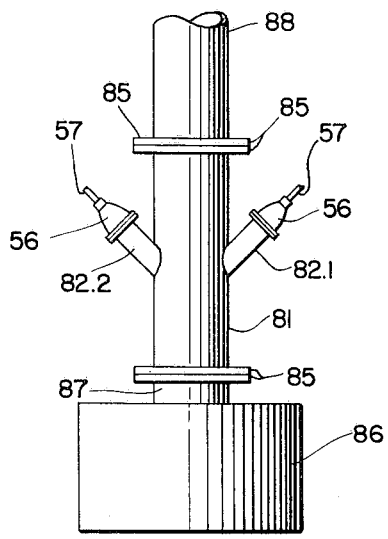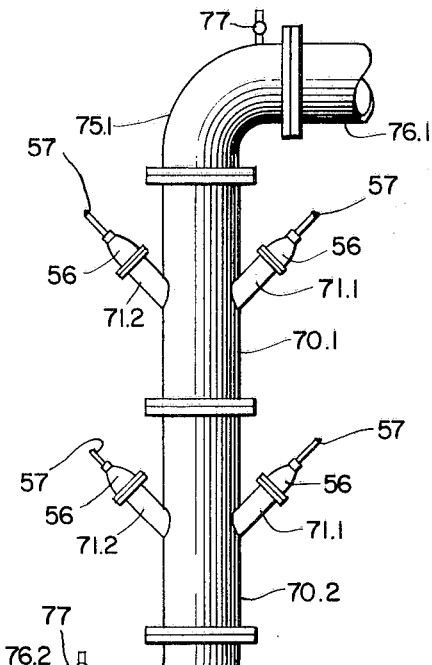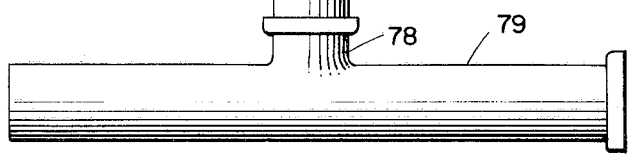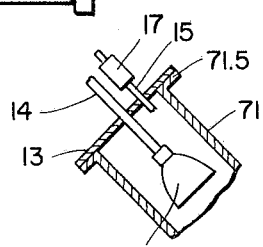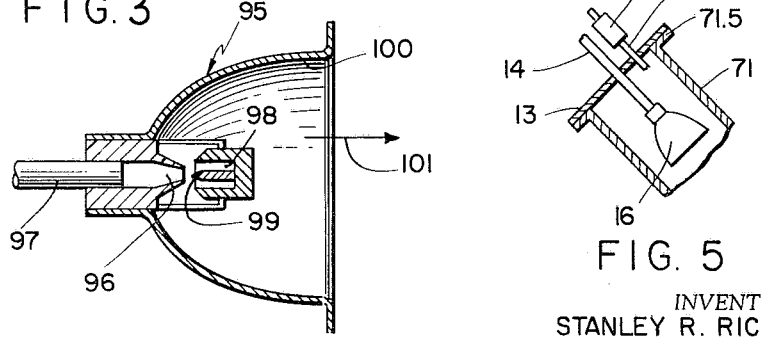
INVENTOR.
STANLEY R. RICH

3,237,384
DEFOAMING SYSTEMS
Stanley R. Rich, West Hartford, Conn., assignor, by mesne assignments, to Northern Industries, Inc., Dover, Del., a corporation of Delaware
Filed Nov. 30, 1961, Ser. No. 155,989
5 Claims. (Cl. 55—178)

This invention relates to defoaming systems, and more particularly to such systems employing elastic waves in gas to break foam.

In general, it may be stated that relative motion between a liquid and an adjoining gas such as the atmosphere, sufficient or in such a direction as to enable the gas to penetrate the liquid or its surface, will produce bubbles of the gas entrapped in the liquid, or foam. The mere pouring of a liquid through a spout thus produces foam, the quantity of which is determined by numerous parameters, some of which are the density of the liquid, its surface tension and the extent of its agitation in the presence of the gas. Liquid products which foam readily when poured, and produce a useful foam when used, such as household detergents and hair shampoos, are well-known. Some other liquid products which produce an innocuous or tolerable foam when poured by the user include edibles such as fruit and vegetable juices, beer and ale, and other such as paints and varnishes. Still other liquid products produce objectionable foam when poured or agitated in the atmosphere; these include liquid sewage wastes and liquid industrial wastes such as the lignin-bearing "black liquor" waste of paper mills. The foam-producing nature of all of these, and other, types of liquid products is objectionable, however, in the processes and machines which produce, use or package (e.g., bottle) them, as a few examples will serve to illustrate.

In the production of hair shampoo, which is intentionally compounded so that it will foam readily, it is desirable to avoid foaming of the product during the bottling operation, in order to fill the bottles quickly and avoid loss of a portion of the product as foam. The nature of the product frustrates this desire, and it has therefore been the practice to fill the bottles to overflowing, capture the overflowing foam and shampoo, and pass it to a settling tank where, after a period of time, sometimes days long, the foam settles and the resulting quantity of shampoo is re-introduced into the bottle-filling machinery. This is costly in time and in storage space.

In the production of edible liquid products, such as fruit and vegetable juices, the same problem exists, and it is complicated by the well-known property of these edible products to spoil if left in the open air for an extended period of time. Since foam obviously increases the surface contact between the liquid and the air, the mere production of foam speeds up such spoilage.

In the production of paper, liquids are handled in the atmosphere, in the head boxes, and coating tanks, and foam at either location causes deterioration of the final product—the paper—by increasing the presence of voids or holes in the paper and its coatings. As has been mentioned above, the waste product includes an objectionable foam, which floats for extended periods of time on rivers and lakes and kills fish and vegetation. The latter problem exists also in connection with sewage disposal plants, particularly since the advent of household detergents, since the latter eventually find their way into municipal sewer systems.

These few examples represent but a small fraction of the problems which foam presents to industry and to whole communities. In some cases, chemical foam depressants can be used, but these cases are limited to those which do not involve a foodstuff or a product which will be damaged by the chemicals, and to those in which the cost of the chemicals is not prohibitive, since such chemicals represent a constantly recurring cost of operation in processes where they are used. Mechanical foam breakers such as centrifuges, screens and paddle devices have achieved only limited success, due in part to their moving parts making them costly and easily corroded and in part to their limited ability to break only the easily-broken foams.

The use of elastic waves in air or gas to collapse foam bubbles has heretofore achieved only limited success. My copending patent application Serial No. 117,015 filed June 14, 1961, discloses and claims a generator of such elastic waves which provides waves of sufficient intensity and appropriate frequency to break bubbles of practically any known type of foam. There are, however, many situations in which foam is produced, sometimes continuously, in volumes beyond the capacity of a single wave generator, or even a battery of generators, to collapse it. For example, black liquor foam is produced at the rate of 1000 cu. ft./min. in some paper pulp processes. For these and similar situations the present invention provides systems which augment the intensity of wave energy of such generators in a specified region, and present in such a region the foam to be broken, thereby achieving with one or a few generators work which would require a much greater number of generators without such systems; these systems are capable of continuous defoaming and of reclaiming defoamed material.

It is the principal object of my present invention to provide systems for breaking foam which maximize the defoaming capabilities of generators of elastic waves in gas. It is another important object of the invention to provide complete defoaming systems employing generators of elastic waves in gas.

It is a further object of the invention to provide such systems for all types of foams and for use in any situation or environment. It is a still further object of the invention to provide defoaming systems which can be used with any type of liquid material, regardless of its corrosive qualities, temperature or other properties or parameters. It is another important object of the invention to provide defoaming systems which will not affect the properties, purity or other characteristics of the product presented to it for defoaming. It is still another object of the invention to provide such defoaming systems which can be readily incorporated into existing processing equipment for handling the material to be defoamed.

It is an additional object of the invention to provide such systems which have maximum versatility in their applicability to the solution of a wide variety of foam problems. It is a still further object of the invention to provide such systems of interchangeable components which are individually not complicated in design.

According to the invention, there is provided a defoaming system comprising a generator of elastic waves in gas, means to confine elastic waves from said generator to a preselected spatial region whereby to augment the intensity of said waves in said spatial region, and means to present in said region material to be defoamed.

The foregoing and other objects and features of the invention will become more fully apparent from the following description of certain embodiments of the invention. This description refers to the accompanying drawings, wherein:

FIGS. 1–3, inclusive, show a series of modifications of an embodiment of the invention;

FIG. 4 is a side-section showing a generator of elastic waves; and

FIG. 5 shows a modification of the embodiments of FIGS. 1–3, respectively.

Defoaming systems based upon the combination of generators of elastic waves in gas and pipe-like conduits may employ the conduits in a vertical disposition, as is shown, for example, in FIGS. 1–3, respectively. In FIG. 1, a vertical pipe 81 has a branch arm 82.1 communicating at an acute angle with the pipe, and end-flanges 85. A generator 56 is fitted to the free end of the branch arm 82.1. With this arrangement, the branch arm 82.1 confines elastic waves from the generator to a pre-selected spatial region within the pipe 81, where the branch arm joins the pipe. Elastic wave energy thus confined within the pipe 81 will destroy foam presented in that region. The foam, or foam-bearing liquid may flow in either direction through the pipe.

FIG. 2 shows an arrangement of two pipe sections 70.1 and 70.2 in series, each section having two side arms 71.1 and 71.2 and a generator 56 fitted at the outer end of each side arm having a gas inlet 57. The provision of two side arms 70.2 and 71.2 in a pipe section 70.1 or 70.2, each side arm joining the pipe section at about the same position relative to the axis of the pipe, serves to concentrate the energy from two generators 56, 56 in the same region in the pipe. I have found that this results in a net augmentation of the elastic wave energy from the generators which provides elastic wave energy at peak intensity levels which are more than twice as high as the algebraic sum of the respective intensity levels of wave energy from the individual generators 56. I have also made multiple-generator side-arm concentrators according to FIG. 2 employing four side arms per pipe section, arranged to concentrate the elastic wave energy from four generators 56 in a preselected region in the pipe section, and found, again, that the net resulting wave energy has peak intensity levels exceeding the algebraic sum of the respective individual intensity levels. Additional side arms could join the pipe sections 70.1 and 70.2. Using multiple-generator wave energy concentrator sections according to FIG. 2, I am able to break foams of the most persistent and long-lasting nature as the foam or foam-bearing liquid flows through the pipe sections 70.1 and 70.2, in sequence, in either direction.

It will be understood that a single pipe section 70.1 or 70.2, as shown in FIG. 2, having two or more generators 56 coupled to it, can be used in an appropriate situation. The flexibility of the present invention makes it possible to use two or more such sections in series, so that systems according to the invention can be adapted to a practically unlimited variety of operating conditions. Thus, for example, if a foam-bearing liquid, or a liquid which foams readily, is being pumped at high speed through a pipe, an arrangement as shown in FIG. 2 will destroy the foam at two locations, and if desired this arrangement can be expanded to provide any desired number of locations in the pipe where foam is destroyed. In FIG. 2 the pipe sections 70.1 and 70.2 are inserted in a pipe line between elbows 75.1 and 75.2, and fluid material can pass through the pipe from the lower section 76.2 to the upper section 76.1, or vice versa. Gas from the generators 56 and the broken foam bubbles (not shown) may be vented through one or more gas vent valves 77, appropriately located in the pipe line. The gas vent valves 77 may be of a type which passes a gas but not a liquid, as used for example in hot-water or steam heating systems.

FIG. 3 shows another system using a single pipe section 70.1 concentrator, fitted with at least two side arms 71.1 and 71.2 and generators 56. The concentrator is connected at one end to a side arm 78 extending at a right angle from a main pipe 79 through which foam or a foam-bearing liquid (not shown) would be passed. The concentrator (pipe section 70.1) extends vertically from the main pipe 79, so that gas from the generators 56 and from broken foam bubbles can pass out through the upper end, in the direction of the arrow 80. The upper end of the pipe 70.1 can be capped and fitted with a gas valve, like the valve 77 in FIG. 2, if desired. This will be useful if fluid in the main pipe 79 is under sufficient pressure to force it far enough up into the pipe 70.1 so that it is above the region in the pipe 70.1 where the elastic wave energy is concentrated. It is desired that the foam rise into this region, and the length of the pipe section 70.1 will be chosen accordingly. Obviously, the direction of fluid flow in the main pipe 79 is not material to the successful operation of the defoaming system.

FIG. 1 shows a vertical concentrator pipe 81, fitted with two side arms 82.1 and 82.2 like the side arms 71.1 and 71.2 of FIG. 2, and a generator 56 coupled to each side arm, and having coupling flanges 85 at its ends. The pipe 81 is fitted at the lower end to a tank 86, which may be a fermenter tank, for example, through a coupling section 87 having a coupling flange 85. An additional pipe section 88 having a coupling flange 85 may be connected to the upper end of the concentrator pipe section 81; this additional pipe section 88 may be another concentrator section, as in FIG. 2, if desired. Foam resulting from the product (not shown) in the tank 86 will rise into the concentrator, where it will be destroyed. As many concentrators as are required to destroy the foam may be used in sequence, one on top of the other; each concentrator may have one or more generators 56, as desired. Gas from the generators and from broken foam bubbles will pass out through the top of the pipe, which may be capped and fitted with a vent pipe 15 and muffler 17, as in FIG. 5 (for suppressing noise from audible elastic wave energy if an audible frequency is used). A cap 13 as in FIG. 5 may be used for this purpose.

It will be appreciated that an arrangement for fitting a wave generator to each side arm, 71.1 and 71.2 in FIG. 9, or 82.1 and 82.2 in FIG. 1, may be accomplished in the manner shown for fitting the generator 16 in FIG. 5. In such cases, each side arm will be fitted with a flange at its end and a cover plate like the plate 13 in FIG. 5 will be used. This cover plate may hold a generator, like the generator 16 having a gas inlet 14 inside the side arm, and may, if desired, be fitted with a vent pipe 15 and muffler 17, if desired. FIG. 5 shows such an arrangement, applied by way of example to the free end of side arm 71, which for purposes of this illustration is shown fitted with a flange 71.5.

FIG. 4 shows a generator 95 of elastic wave energy in gas, which is described and claimed in my copending application Serial No. 117,015, filed June 14, 1961. A gas nozzle 96 adapted to be fed with gas over a pipe 97, cooperates with a cavity 98 fitted with a vortex-forming pin 99, to produce intense elastic wave vibrations when gas at a suitable pressure is supplied. A wave-reflector 100 serves to concentrate and direct the waves in the general direction of the arrow 101. My present invention is not limited to this wave generator, however, and systems according to the invention using other wave generators are within the scope of the invention.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specifications are also within the spirit and scope of the invention, and it is intended that this invention includes all modifications and equivalents which fall within the scope of the appended claims.

What is claimed is:

1. Defoaming apparatus comprising a substantially vertical pipe-like conduit adapted to communicate with the upper portion of a tank, a plurality of side-arm conduits communicating with the interior of said vertical conduit and mounted symmetrically on a side wall of said vertical conduit at an angle with respect to said vertical conduit, the extended axes of said side-arm conduits all intersecting at a single point in the axial center of said vertical conduit, a plurality of generators of elastic waves in gas characterized in that the waves are foam destroying waves, said generators being constructed and arranged to produce waves by vortex formation of gas in constricted flow each generator substantially coaxially mounted upon a separate one of said side-arm conduits, whereby said side-arm conduits concentrate said elastic waves from each of said generators in a preselected spatial region in said vertical conduit for subjecting foam in said vertical conduit to highly intensified elastic waves in said spatial region.

2. Defoaming apparatus according to claim 1 in which said plurality of side-arm conduits is two side-arm conduits.

3. Defoaming apparatus according to claim 1 in which said vertical pipe-like conduit is connected to the upper portion of a tank.

4. Defoaming apparatus according to claim 1 in which said angle is such that the outer ends of said side-arm conduits are substantially higher than the level at which said side-arm conduits are mounted on said vertical conduit, whereby said generators are positioned above said level.

5. Defoaming apparatus according to claim 1 in which said generators of elastic waves in gas each comprise a gas nozzle adapted to be fed with gas, vortex-forming means including a cavity cooperating with said nozzle to produce intense elastic waves when gas at a suitable pressure is supplied, and a wave reflector extending about said nozzle serving to concentrate and direct the waves in a predetermined direction.

References Cited by the Examiner

UNITED STATES PATENTS

| | | | |
|---|---|---|---|
| 1,449,114 | 3/1923 | Hayduck | 55—178 |
| 1,984,789 | 12/1934 | Everett | 252—361 X |
| 2,238,668 | 4/1941 | Wellenstein | 116—137 |
| 2,300,761 | 11/1942 | Amy. | |
| 2,351,059 | 6/1944 | Martin | 141—69 X |
| 2,369,020 | 2/1945 | Clark | 55—277 |
| 2,649,758 | 8/1953 | Cowgill | 252—361 X |
| 2,800,100 | 7/1957 | Boucher. | |
| 2,896,922 | 7/1959 | Pohlman | 55—277 |
| 3,018,843 | 1/1962 | Mercier | 55—178 |
| 3,025,828 | 3/1962 | Heilman | 118—63 |
| 3,026,966 | 3/1962 | Asklof | 55—277 X |
| 3,064,619 | 11/1962 | Fortman | 116—137 |
| 3,097,936 | 7/1963 | Lincoln | 55—292 |
| 3,109,721 | 11/1963 | Zenner et al. | 55—277 |
| 3,154,465 | 10/1964 | Degnen | 55—277 |

FOREIGN PATENTS

| | | |
|---|---|---|
| 868,228 | 2/1953 | Germany. |
| 460,795 | 2/1937 | Great Britain. |

OTHER REFERENCES

Boucher: Ultrasonics in Processing, in Chemical Engineering, October 2, 1961, pages 83–100.

Boucher: Ultrasonic News IV, pages 11–19, Spring 1960, QC 244 A. U5.

Branson: Ultrasonic Corp., Roll Around Cleaning Unit, in Ultrasonic News IV (i), page 6, Spring 1960, QC 244 A1 U5.

REUBEN FRIEDMAN, *Primary Examiner.*